(12) United States Patent
Kim

(10) Patent No.: US 10,581,480 B1
(45) Date of Patent: Mar. 3, 2020

(54) ROTATABLE MOBILE PHONE SHELL

(71) Applicant: Jin Woo Kim, Seongnam-si (KR)

(72) Inventor: Jin Woo Kim, Seongnam-si (KR)

( * ) Notice: Subject to any disclaimer, the term of this patent is extended or adjusted under 35 U.S.C. 154(b) by 0 days.

(21) Appl. No.: 16/509,740

(22) Filed: Jul. 12, 2019

(30) Foreign Application Priority Data

Sep. 20, 2018 (KR) .................. 20-2018-0004385 U

(51) Int. Cl.
*H04B 1/3888* (2015.01)
*H04M 1/18* (2006.01)
*A45C 11/00* (2006.01)
*H04M 1/04* (2006.01)

(52) U.S. Cl.
CPC ............ *H04B 1/3888* (2013.01); *A45C 11/00* (2013.01); *H04M 1/04* (2013.01); *H04M 1/185* (2013.01); *A45C 2011/002* (2013.01); *A45C 2200/15* (2013.01)

(58) Field of Classification Search
CPC .......................... H04B 1/3888; H04M 1/0206
See application file for complete search history.

(56) References Cited

U.S. PATENT DOCUMENTS

2017/0104854 A1\* 4/2017 Park ........................ A45F 5/00

FOREIGN PATENT DOCUMENTS

| KR | 20-0468710    | * | 5/2013 | ............. H04M 1/04 |
|----|---------------|---|--------|------------------------|
| KR | 20-0468710 Y1 |   | 9/2013 |                        |
| KR | 10-1392562 B1 |   | 5/2014 |                        |
| KR | 10-1735010 B1 |   | 5/2017 |                        |

\* cited by examiner

*Primary Examiner* — Myron Wyche
(74) *Attorney, Agent, or Firm* — KORUS Patent, LLC; Seong Il Jeong

(57) ABSTRACT

A rotatable mobile phone shell is provided. The rotatable mobile phone shell includes a shell body, a rotating component, a finger gripping component and a spring component. The invention has the effect of safely and conveniently using mobile phone while protecting mobile phone.

2 Claims, 3 Drawing Sheets

ROTATABLE MOBILE PHONE SHELL

TECHNICAL FIELD

The invention relates to a rotatable mobile phone shell.

BACKGROUND ART

A shell having replaceable module for portable terminal is disclosed in Republic of Korea registered patent No. 1392562. The invented shell comprises: a shell enclosing and protecting the outer surface of a portable terminal; a mounting groove concavely-formed on the back surface of the shell; a connector rotationally connected in the mounting groove; and a replaceable module consisting of an operation portion, wherein the operation portion is rotationally connected relative to the connector, is received in the mounting groove during folding, and has function of holder of the portable terminal during unfolding.

The prior art has the advantage of unfolding the operation portion by simple operation to support the portable terminal at a desired angle. The replaceable module can be easily replaced and can be manufactured with various designs and functions. The functions of mirror, magnifying lens, traffic card, etc. can be combined in the operation portion of the replaceable module, thereby achieving effect of providing shell with comprehensive applications for portable terminal. On the other hand, to achieve that the connector 310 is rotationally combined with an assembling-disassembling groove 210, the shell becomes thick, at the same time, owing to the tail end rotating manner of the connector 310, the durability is reduced due to repeated use, and the probability of breakage is increased, so that the prior art has the disadvantage of being unstable when it is supported.

DISCLOSURE

Technical Problem

To solve the above problems, the invention provides a rotatable mobile phone shell, which has no protruding portion of a shell body, so that the shell body is beautiful and can safely and strongly grip the shell.

Technical Solution

The object of the invention is to provide a rotatable mobile phone shell, comprising: a shell body having front-opening hollow structure and formed with a coupling through hole on back surface; a rotating component comprising a rotating ring component, a hinge coupling concave portion and a spring insertion portion, wherein, the peripheral surface of the rotating ring component is capable of rotating with respect to the inner circumferential surface of the coupling through hole, the hinge coupling concave portion is arranged on the inner circumferential surface of the rotating ring component, and the spring insertion portion is formed on the inner circumferential surface of the rotating ring component and communicated to the two end portions of the hinge coupling concave portion; a finger gripping component comprising a finger gripping ring, a hinge end and a spring insertion groove, wherein the hinge end is integrated on the peripheral surface of the finger gripping ring and arranged at the hinge coupling concave portion, the spring insertion groove is formed at one end of the hinge end, and one side surface of the finger gripping ring is communicated to the other end of the hinge end; and a spring component inserted into the spring insertion groove and having two end portions forcibly pressed into the spring insertion portion.

Preferably, the inner circumferential surface of the coupling through hole of the invention consists of a first two-end circumferential surface portion and a first central circumferential surface portion located at inner side of the first two-end circumferential surface portion; and the first two-end circumferential surface portion is rounded and chamfered, the first central circumferential surface portion is formed to be 0.1-1 mm larger than the inner diameter of the coupling through hole, and a plurality of blocking protrusions spaced at the same distance are formed on the first central circumferential surface portion. The peripheral surface of the rotating ring component consists of a second two-end circumferential surface portion and a second central circumferential surface portion located at inner side of the second two-end circumferential surface portion; and the second two-end circumferential surface portion is rounded and chamfered, the second central circumferential surface portion is formed with a convex portion having semi-arc section in radius direction, and a plurality of blocking grooves spaced at the same distance are formed on the second central circumferential surface portion for insertion or detachment of the blocking protrusions Preferably, the finger gripping component further comprises: a pull-out end portion formed on the inner circumferential surface of the finger gripping ring, and a cover protrusion provided on the peripheral surface of the finger gripping ring.

The effect of the invention is as follow:

The invention as described above has the effect of safely and conveniently using mobile phone while protecting mobile phone.

Figure 1:
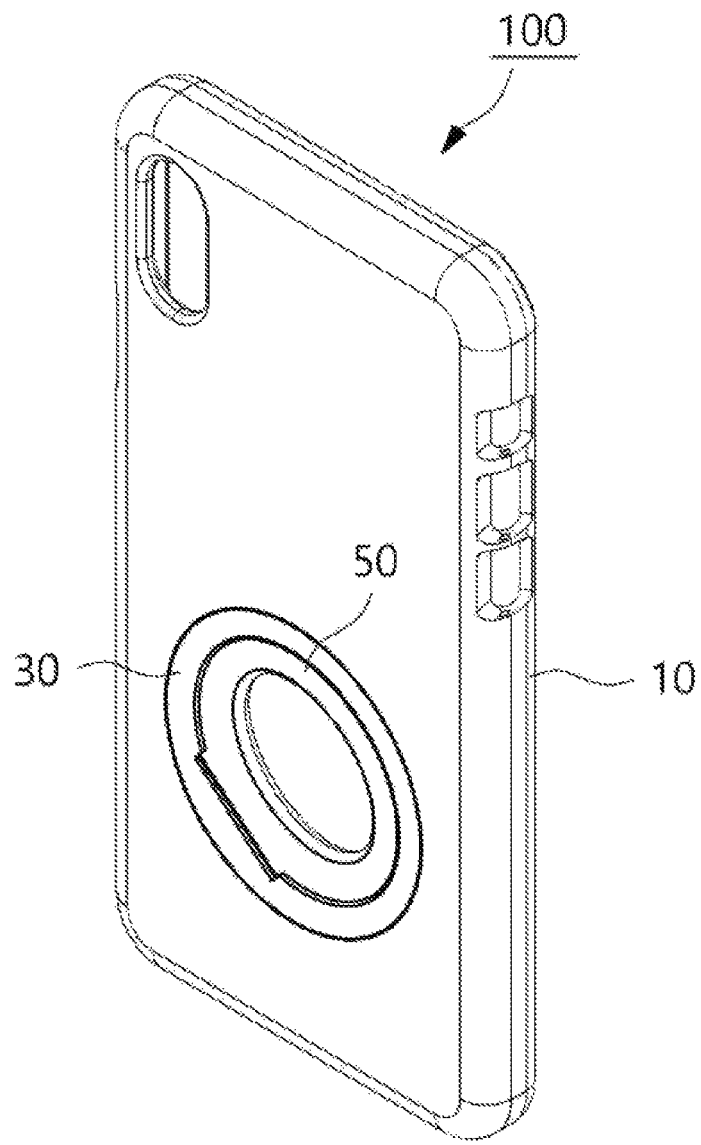
FIG. 1 illustrates stereoscopic view of the rotatable mobile phone shell in accordance with the invention.

Wherein the drawing reference numerals are as follows:

10: shell body; 30: rotating component; 31: rotating ring component; 33: hinge coupling concave portion; 35: spring insertion portion; 50: finger gripping component; 51: finger gripping ring; 53: hinge end; 55: spring insertion groove; 70: spring component; 100: rotatable mobile phone shell.

BEST MODE

Hereinafter, the invention is described in reference to the drawings.

Figure 2:
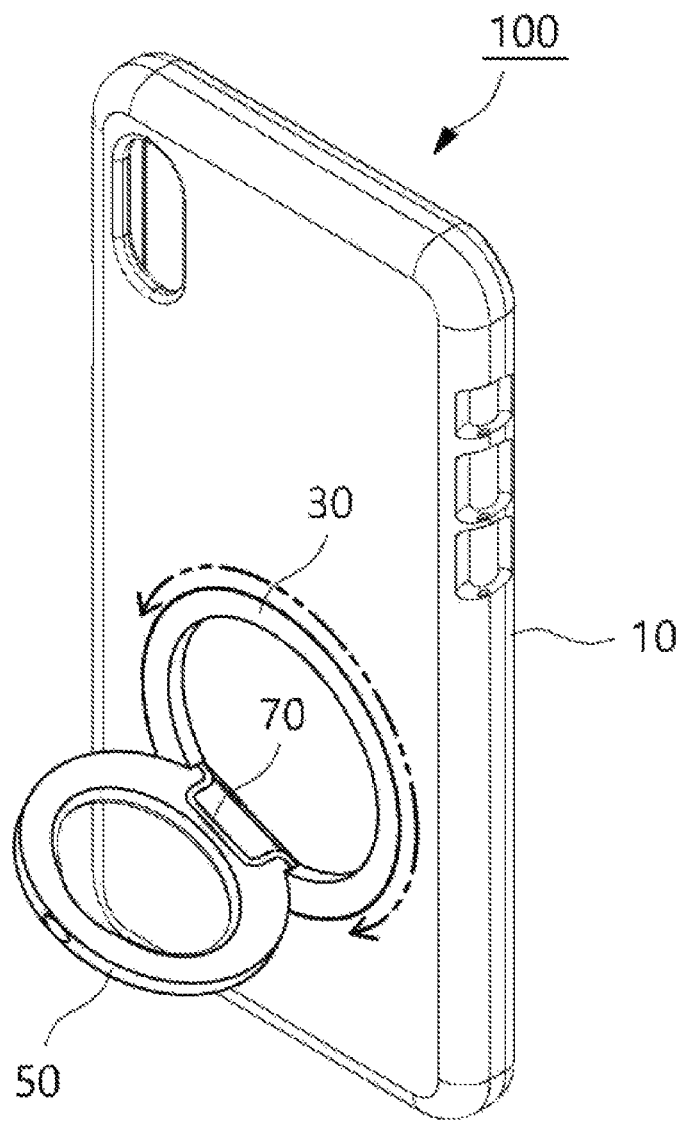
FIG. 2 illustrates stereoscopic view of the rotatable mobile phone shell of FIG. 1 at state of unfolding a holder ring.
Figure 3:
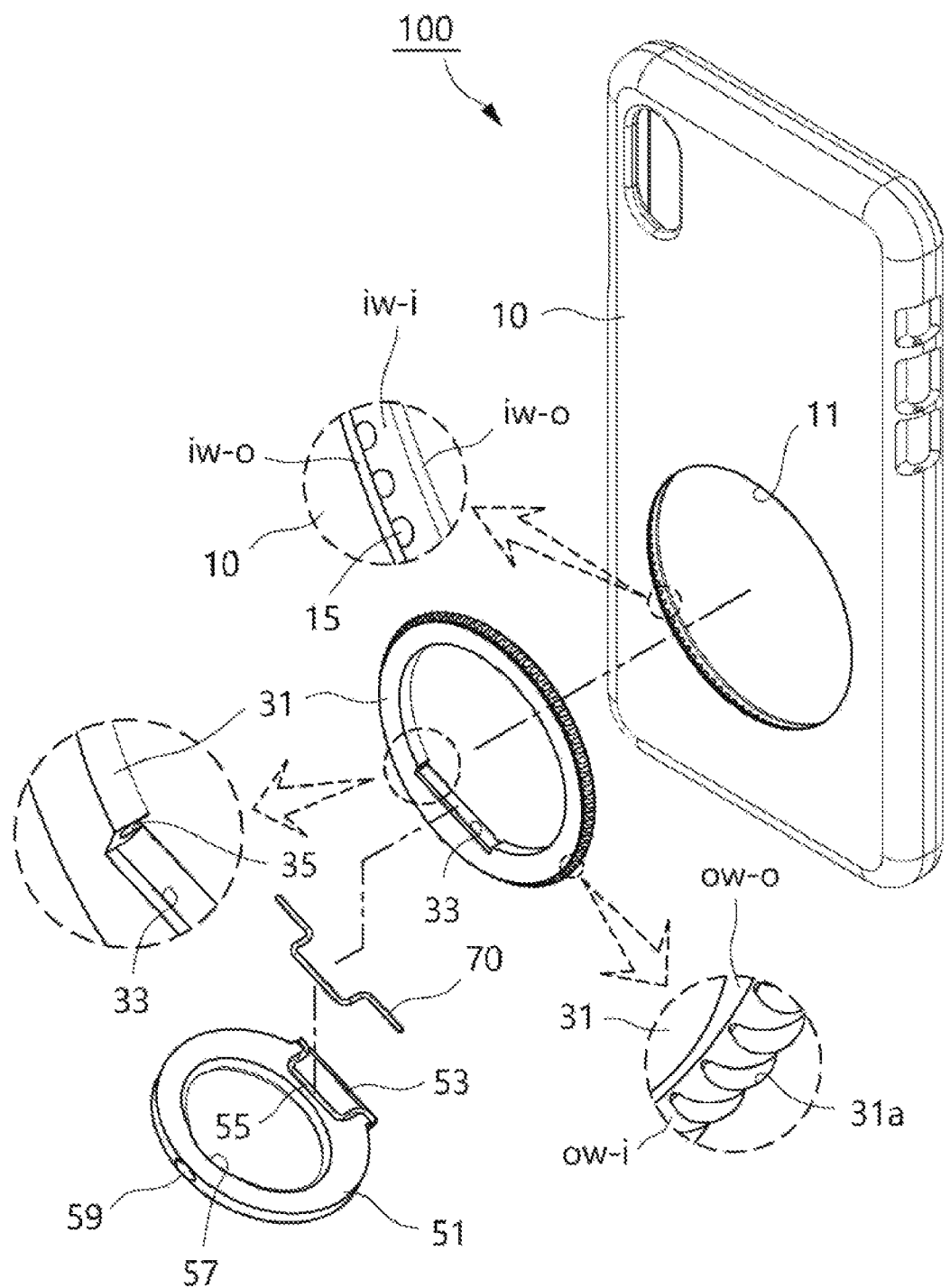
FIG. 3 illustrates exploded stereoscopic view of FIG. 1.

Referring to FIGS. 1-3, the rotatable mobile phone shell 100 comprises a shell body 10, a rotating component 30, a finger gripping component 50, and a spring component 70.

The shell body 10 has front-opening hollow structure, and is formed with a plurality of through holes (not shown) on upper surface and side surface. The through holes of the shell body 10 are formed to expose a camera button, an earphone socket, a power button, etc. of mobile phone (not shown), which are unnecessary constituent elements of the technical idea of the embodiment, and detailed descriptions or illustrations of them are omitted.

Further, the shell body 10 is formed with a coupling through hole 11 on back surface. The coupling through hole 11 is processed into perfect circle.

Further, the inner circumferential surface of the coupling through hole 11 is divided into a first two-end circumferential surface portion iw-o and a first central circumferential surface portion iw-i located at inner side of the first two-end circumferential surface portion iw-o. The first two-end circumferential surface portion iw-o is rounded and chamfered. The first central circumferential surface portion iw-i is formed to have inner diameter larger than that of the coupling through hole 11, wherein the inner diameter of the first central circumferential surface portion iw-i is processed to be about 0.1-1 mm larger than that of the coupling through hole 11.

Further, a plurality of blocking protrusions 15 spaced at the same distance are formed on the first central circumferential surface portion iw-i.

The rotating component 30 comprises: a rotating ring component 31 having peripheral surface to be capable of rotating with respect to the inner circumferential surface of the coupling through hole 11; a hinge coupling concave portion 33 arranged on the inner circumferential surface of the rotating ring component 31; and a spring insertion portion 35 formed on the inner circumferential surface of the rotating ring component 31 and communicated to the two ends of the hinge coupling concave portion 33.

The peripheral surface of the rotating ring component 30 is divided into a second two-end circumferential surface portion ow-o and a second central circumferential surface portion ow-i located at inner side of the second two-end circumferential surface portion ow-o. The second two-end circumferential surface portion ow-o is rounded and chamfered. The second central circumferential surface portion ow-i is formed with a convex portion having semi-arc section in radius direction. A plurality of blocking grooves 31a spaced at the same distance are formed on the second central circumferential surface portion ow-i for insertion or detachment of the blocking protrusions 15.

Wherein, the peripheral surface of the rotating ring component 30 is required to be manufactured into perfect circle for rotation, while the inner circumferential surface is the portion into which the user's finger is inserted, therefore, the inner circumferential surface is not required to be manufactured into perfect circle and can be modified into various shapes.

The spring insertion portion 35 is provided for insertion of two end portions of later-described spring component 70, and preferably has cut groove shape having one side opening.

The finger gripping component 50 comprises: a finger gripping ring 51, a hinge end 53 and a spring insertion groove 55. The hinge end 53 is integrated on the peripheral surface of the finger gripping ring 51 and arranged at the hinge coupling concave portion 33. The spring insertion groove 55 is formed at one end of the hinge end 53, and one side surface of the finger gripping ring 51 is communicated to the other end of the hinge end 53.

The finger gripping component 50 further comprises a pull-out end portion 57 on the inner circumferential surface of the finger gripping ring 51. The pull-out end portion 57 of the present embodiment is formed as a concave portion, but is not limited thereto, and can be modified to be a convex portion. Preferably, the pull-out end portion 57 is provided at opposite position of the hinge end 53.

Further, the finger gripping component 50 comprises a cover protrusion 59 provided on the peripheral surface of the finger gripping ring 51.

The spring component 70 is inserted into the spring insertion groove 55 and two end portions forcibly pressed into the spring insertion portion 35.

Next, a method for assembling the rotary mobile phone shell 100 of the present embodiment having such a configuration is briefly described. Referring to FIG. 3, after the spring component 70 is inserted into the spring insertion groove 55, two end portions are forcibly pressed into the spring insertion portion 35, and the finger gripping component 50 is assembled to the rotating component 30; then, one side surface of the rotating component 30, in which the finger gripping component 50 is assembled, is tightly pressed to the coupling through hole 11, and force or press is applied to forcibly press the rotating component 30 into the coupling through hole 11 to complete assembly. At this time, when the blocking protrusions 15 are not inserted into the blocking grooves 31a, the finger is put in the finger gripping ring 51 to rotate, and the blocking protrusions 15 are inserted into the blocking grooves 31a, so that the rotating component 30 is fixed in the coupling through hole 11.

Further, an application method of the rotatable mobile phone shell 100 is briefly described below. Initially, in the state of FIG. 1, the pull-out end portion 59 is pulled out by a fingertip, the finger gripping component 50 is unfolded, at this time, the finger gripping component 50 is rotated with the spring component 70 as a reference to unfold.

Then, after an index finger or a middle finger is inserted in the finger gripping ring 51 of the finger gripping component 50, the mobile phone shell 100 is used at the state that other fingers or palm are or is used to grip the entire mobile phone shell 100 including back surface and by rotating at a desired angle. At this time, the blocking protrusions 15 are detached from the blocking grooves 31a during rotation, if it is stopped when the desired angle is rotated, the blocking protrusions 15 are inserted into the blocking grooves 31a, and the rotating component 30 is no longer rotated and fixed.

Further, the rotatable mobile phone shell 100 of the present embodiment can be used by holder type, but basic application example is used by lifting the mobile phone shell 100.

The invention described above is limited to an embodiment for description, but is not limited thereto. The embodiments modified based on the technical idea of the invention are obviously all within the scope of the invention.

What is claimed is:

1. A rotatable mobile phone shell, comprising:
   a shell body having front-opening hollow structure and formed with a coupling through hole on back surface;
   a rotating component comprising a rotating ring component, a hinge coupling concave portion, and a spring insertion portion, wherein, a peripheral surface of the rotating ring component is capable of rotating with respect to an inner circumferential surface of the coupling through hole, the hinge coupling concave portion is arranged on an inner circumferential surface of the rotating ring component, and the spring insertion portion is formed on the inner circumferential surface of the rotating ring component and communicated to two end portions of the hinge coupling concave portion;
   a finger gripping component comprising a finger gripping ring, a hinge end, and a spring insertion groove, wherein the hinge end is integrated on a peripheral surface of the finger gripping ring and arranged at the hinge coupling concave portion, the spring insertion groove is formed at the hinge end and one side surface of the finger gripping ring, and configured to communicate one end of the hinge end to the other end of the hinge end through the one side surface of the finger gripping ring; and a spring component inserted into the spring insertion groove and having two end portions forcibly pressed into the spring insertion portion;

wherein the inner circumferential surface of the coupling through hole consists of a first two-end circumferential surface portion and a first central circumferential surface portion located at inner side of the first two-end circumferential surface portion; and the first two-end circumferential surface portion is rounded and chamfered, the first central circumferential surface portion is formed to be 0.1-1 mm larger than an inner diameter of the coupling through hole, and a plurality of blocking protrusions spaced at a predetermined distance are formed on the first central circumferential surface portion;

wherein the peripheral surface of the rotating ring component consists of a second two-end circumferential surface portion and a second central circumferential surface portion located at inner side of the second two-end circumferential surface portion; and the second two-end circumferential surface portion is rounded and chamfered, the second central circumferential surface portion is formed with a convex portion having semi-arc section in radius direction, and a plurality of blocking grooves spaced at the predetermined distance are formed on the second central circumferential surface portion for insertion or detachment of the blocking protrusions.

2. The rotatable mobile phone shell of claim 1, wherein the finger gripping component further comprises:

a pull-out end portion formed as a concave portion or a convex portion at an opposite position of the hinge end on the inner circumferential surface of the finger gripping ring, and a cover protrusion provided on the peripheral surface of the finger gripping ring.

* * * * *